United States Patent [19]
Ohdaira

[11] Patent Number: 5,140,539
[45] Date of Patent: Aug. 18, 1992

[54] ELECTRONIC APPARATUS HAVING KEY INPUT MEANS AND KEY ACTIVATED INTERRUPTION SIGNALS

[75] Inventor: Isao Ohdaira, Kawasaki, Japan

[73] Assignee: Canon Kabushiki Kaisha, Tokyo, Japan

[21] Appl. No.: 593,645

[22] Filed: Oct. 4, 1990

[30] Foreign Application Priority Data

Oct. 6, 1989 [JP] Japan ................................ 1-260136

[51] Int. Cl.⁵ .............................................. G06F 1/00
[52] U.S. Cl. ................................................. 364/707
[58] Field of Search ..................................... 364/707

[56] References Cited

U.S. PATENT DOCUMENTS

| | | | |
|---|---|---|---|
| 4,479,191 | 10/1984 | Nojima et al. | 364/707 |
| 4,598,383 | 7/1986 | Leach | 364/707 X |
| 4,851,987 | 7/1989 | Day | 364/707 X |

*Primary Examiner*—Long T. Nguyen
*Attorney, Agent, or Firm*—Fitzpatrick, Cella, Harper & Scinto

[57] ABSTRACT

In electronic apparatus, a central processing unit (CPU) reads a key input, and an operation clock can be supplied to the CPU when processing corresponding to the key input must be performed to substantially reduce electric power consumption for a key input waiting period. The on/off operation of a switch by a key operation is detected even when the operation clock of the CPU is stopped and ON-chattering or OFF-chattering of the switch by the key operation is eliminated.

8 Claims, 4 Drawing Sheets

| FIG.1A-1 | FIG.1A-2 |

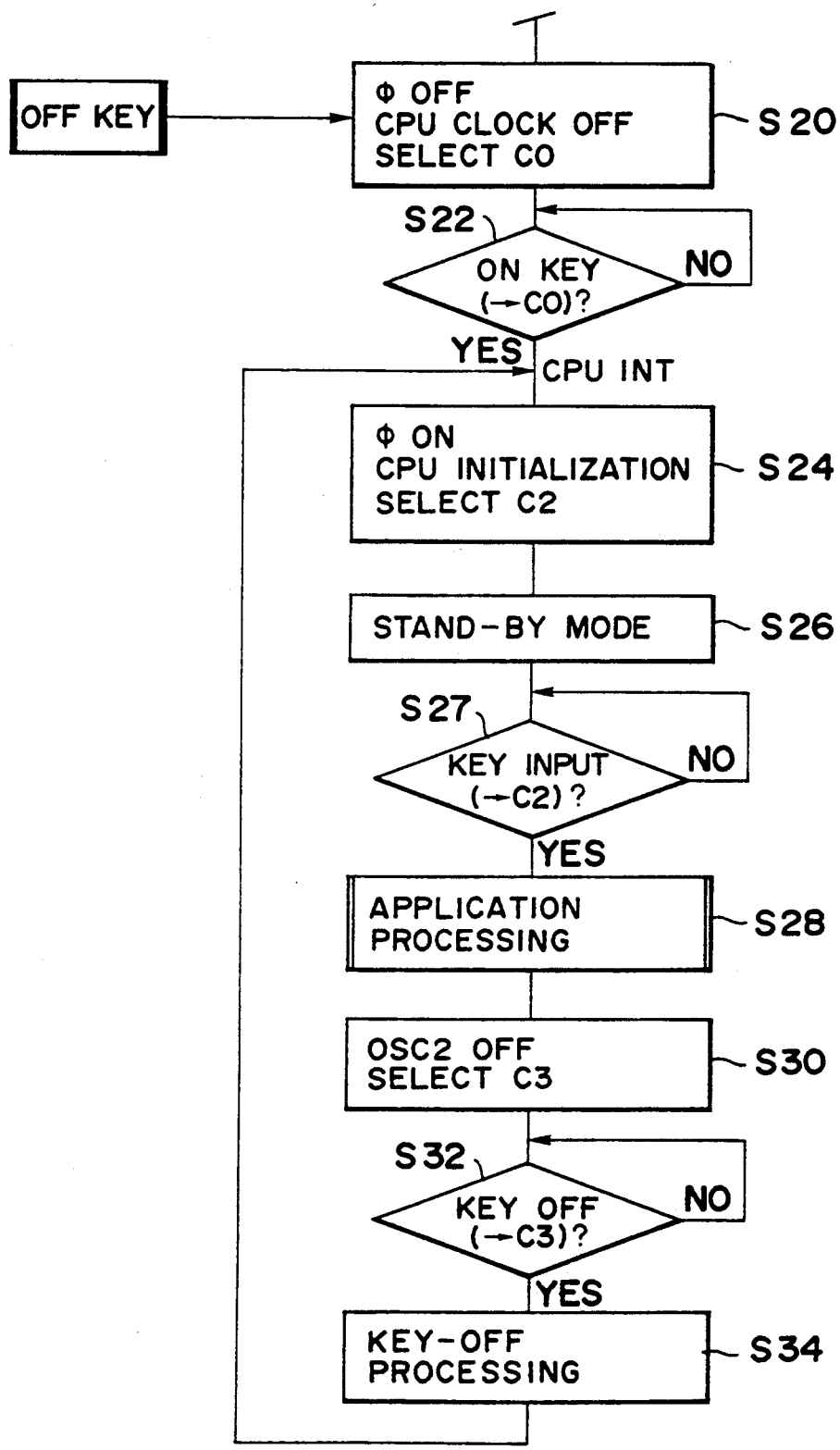

ELECTRONIC APPARATUS HAVING KEY INPUT MEANS AND KEY ACTIVATED INTERRUPTION SIGNALS

BACKGROUND OF THE INVENTION

1. Field of the Invention

The present invention relates to an electronic apparatus having key input means and, more particularly, to an electronic apparatus for executing a predetermined information processing by a central processing unit (CPU) which can stop the oscillation of operation clocks and can shift to a stand-by mode for a key input waiting period of time.

2. Related Background Art

Hitherto, in electronic apparatuses which are driven by a battery or the like, there has been known a technique to execute a clock control for a key input waiting period of time in order to reduce a current consumption of the apparatus.

For instance, there has been known a construction such that operation clocks of a CPU are stopped for the key input waiting period of time and the operation clocks are supplied to the CPU for a predetermined period by a timer interruption and a key input is read or a construction such that two oscillators to generate high and low frequency clocks are provided and the CPU is made operative by the low frequency clocks for a key input waiting period of time.

According to the former conventional technique, even if a timer interruption of a period of about 10 msec (milliseconds) is executed, a time of at least 5 msec is needed for warming-up of the CPU clocks and for reading of a key input and a current consumption can be merely reduced to about the half.

On the other hand, according to the latter conventional technique, a current consumption which can be saved depends on frequency characteristics of the current consumption of a memory and, particularly, in the case of the recent ROM of a large capacity, even if the operation clock frequency of the CPU is reduced, the current consumption cannot be largely reduced.

Therefore, there is also considered a method whereby an RAM whose current consumption is proportional to the operation clocks is used and only the contents of key input processings are previously transferred to the RAM and a key input waiting processing is performed in the RAM. However, the above method has problems such that the data in the RAM becomes random (changes) due to electrostatic noises, the CPU rans away, there is a tendency such that as the capacity of the RAM is large, a current consumption increases, a current consumption remarkably changes due to the maker of the device, and the like.

SUMMARY OF THE INVENTION

It is an object of the invention that by providing means for detecting the on/off operation of a switch by a key operation even during the stop of operation clocks of a CPU and means for eliminating an ON-chattering or an OFF-chattering of the switch by a key operation, when a key is depressed and the CPU reads the key input and a processing corresponding to the key input must be executed, operation clocks can be supplied to the CPU and an electric power consumption for a key input waiting period of time can be fairly efficiently reduced.

BRIEF DESCRIPTION OF THE DRAWINGS

FIG. 1B is a flowchart showing the operation of an apparatus; and

FIGS. 2, 3 and 4 are block diagrams showing modifications of a circuit of FIG. 1 as second to fourth embodiments, respectively.

DETAILED DESCRIPTION OF PREFERRED EMBODIMENTS

Figures 1, 1A:
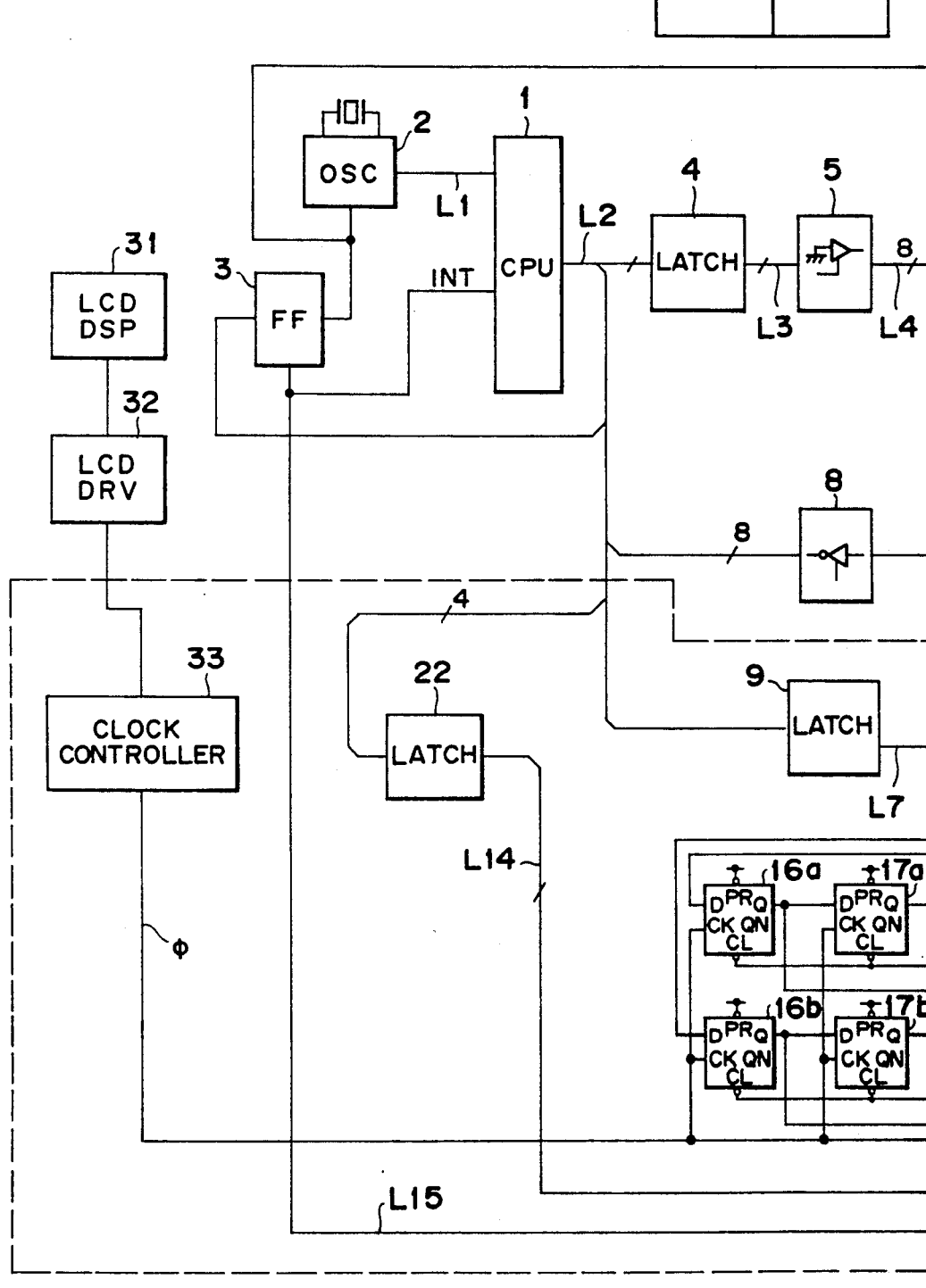
FIGS. 1A, 1A-1 and 1A-2 constitute a block diagram showing a construction of the first embodiment according to the invention.

The present invention will be described in detail hereinbelow with respect to embodiments shown in the drawings. There is shown a construction which is common to electronic apparatuses or information processing apparatuses which have a CPU as a main control unit and a keyboard as operation input means.

First embodiment

Figures 1, 1A, 2:
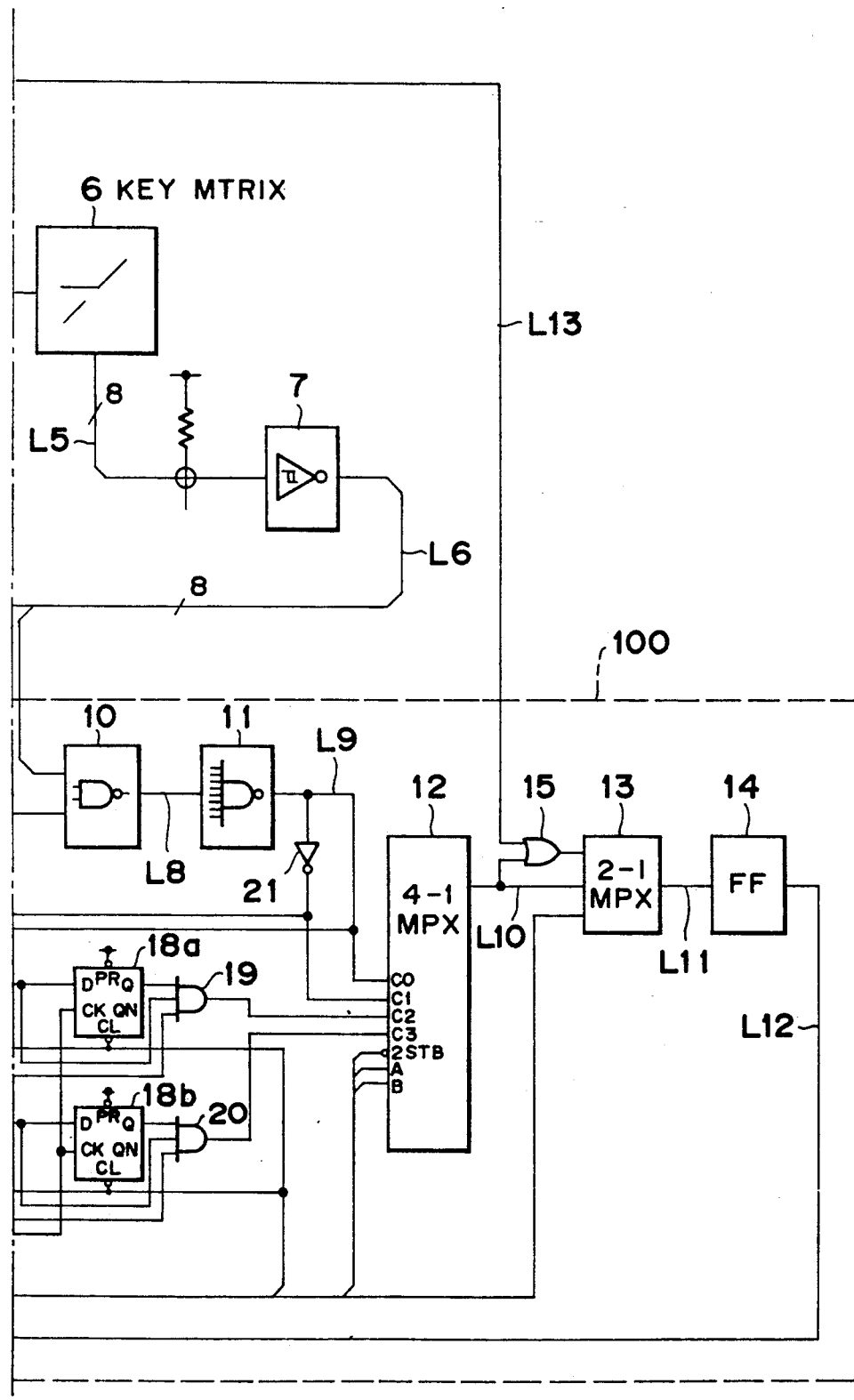
Figure 2:
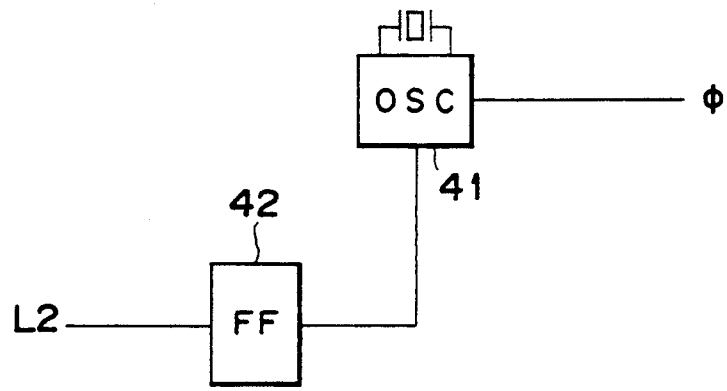

FIGS. 1A-1 and 1A-2 show a construction of a main section of an apparatus which uses the invention. In the diagram, reference numeral 1 denotes a CPU which operates by clocks which are generated from an oscillator 2 comprising a crystal oscillator or the like. It is assumed that the CPU 1 has an operating mode, what is called a stand-by mode (holding mode) of an extremely small electric power consumption by stopping the oscillation of the oscillator 2 through a flip-flop 3, which will be explained hereinlater.

The oscillating operation of the oscillator 2 is controlled via the flip-flop 3. The flip-flop 3 is set by an interruption signal (INT) to the CPU 1. A control system 100 of the oscillator 2 shown by a broken line in a lower portion in the diagram will be explained hereinlater.

An operation input of a keyboard is detected by a well-known key matrix 6. The CPU 1 supplies a key strobe signal indicative of a reading timing of a key input to the key matrix 6 through a latch 4 and an open drain buffer 5. The latch 4 latches the key strobe signal for a predetermined period of time. The open drain buffer 5 inverts the key strobe signal from the latch 4 and outputs to the key matrix 6.

The key matrix 6 is a (8×8) matrix and detects the operation input from 64 keys. What are called an ON key and an OFF key (both are not shown) are included in the 64 keys.

Output information (a plurality of bits) of the key matrix 6 is inverted by a Schmitt trigger inverter 7 and is output. The inverted output signal is further inverted by a 3-state buffer 8 and is input to a bus $L_2$ of the CPU 1.

An output of the Schmitt trigger inverter 7 is also connected to an NAND array 10 of the control system 100. The NAND array 10 has a plurality of 2-input gates and calculates the NAND of the output of the Schmitt trigger inverter 7 and each of the corresponding bits of an output of the latch 9 and outputs to an 8-input NAND gate 11. The latch 9 has a predetermined address on the bus $L_2$ of the CPU 1 and latches the output data of the CPU 1. The output data is used to mask the output of the Schmitt trigger inverter 7 by a predetermined pattern.

The output data of the Schmitt trigger inverter 7 which was masked by the data of the latch 9 by the HAND array 10 is input to the 8-input AND gate 11.

The 8-input NAND gate 11 discriminates whether all of the bits of the output of the NAND array 10 are set to logic "1" or not and outputs the result of the discrimination. An output of the 8-input NAND gate 11 and an inverted output of an inverter 21 are input to input terminals $C_0$ and $C_1$ of a multiplexer 12, respectively. Outputs of AND gates 19 and 20 are also input to (input terminals $C_2$ and $C_3$ of) the multiplexer 12.

The output of the NAND gate 11 is also input to a 3-stage shift register comprising edge trigger type flip-flops 16a, 17a, and 18a and to another 3-stage shift register comprising the edge trigger type flip-flops 16b, 17b, and 18b, respectively.

The flip-flops 16a, 17a, and 18a construct a delay circuit to eliminate the ON-chattering upon key input. The flip-flops 16b, 17b, and 18b construct a delay circuit to eliminate the OFF-chattering upon key input. Those delay circuits operate synchronously with clocks $\phi$.

The clocks $\phi$ are external clocks and are obtained by, for instance, dividing reference clocks of a driver 32 (common driver, LCD controller, or the like) of an LCD display 31 into clocks of a period of about 5 msec by a clock controller 33 comprising a prescaler and the like as shown in the diagram. In the case where the clocks $\phi$ are derived from the LCD driver 32, the clocks $\phi$ are turned on/off in accordance with the presence/absence of the display. In the embodiment, it is assumed that the display of the LCD is stopped in the power saving mode by the well-known power saving control and the generation of the clocks $\phi$ are also stopped at this time.

The AND gate 19 outputs the AND of the outputs of the respective stages of the shift register comprising the flip-flops 16a, 17a, and 18a. The AND gate 20 outputs the AND of the outputs of the respective stages of the shift register comprising the flip-flops 16b, 17b, and 18b.

The multiplexer 12 which receives the above signals is of the type of four inputs and one output. The multiplexer 12 selects and outputs either one of the signals of the input terminals $C_0$ to $C_3$ in accordance with the control data of the CPU 1 which is input through a latch 22. That is, either one of the signal at the terminal $C_0$ from which the chattering is not eliminated, the inverted signal at the terminal $C_1$ of the above signal, the signal at the terminal $C_2$ from which the ON-chattering was eliminated, and the signal at the terminal $C_3$ from which the OFF-chattering was eliminated is selected and output.

The latch 22 receives a 4-bit signal. Two bits among the four bits are used for the selection control (terminals A and B) of the multiplexer 12, one bit (CCC) is used to inhibit the output of the multiplexer 12 (terminal 2STB), and the remaining one bit is used to reset the flip-flops 16a to 18a and 16b to 18b. When the CPU 1 enters the stand-by mode, the latch 22 is set by the CPU 1 prior to stopping the clocks.

A multiplexer 13 is of the type of two inputs and one output. The output of the multiplexer 12 is input to one input terminal of the multiplexer 13 and the OR between the clock and the output of the multiplexer is input to the other input terminal. The multiplexer 13 is controlled by one bit different from the control data of the multiplexer 12 in the data latched in the latch 22.

An output of the multiplexer 13 is connected to a flip-flop 14. When the output of the multiplexer 13 indicates an interruption signal, the flip-flop 14 latches and holds the interruption signal and outputs to the flip-flop 3.

The operation in the above construction will now be described with reference to FIG. 1B. FIG. 1B shows the operation of the whole apparatus by the control of the control system 100 and also partially includes processings which are executed by the CPU 1. Signal lines in FIGS. 1A-1 and 1A-2 are designated by reference characters $L_1$ to $L_{11}$ in the diagram hereinbelow.

In the power OFF mode in step S20 in FIG. 1B, the LCD driver 32 is stopped, so that the display is not performed and the clocks $\phi$ are stopped. The oscillation of the oscillator 2 is stopped and the CPU 1 is in the stand-by mode. If the depression of an OFF key has been detected by a key input detecting step, which will be explained hereinlater, the processing routine advances to step S20.

However, at this time, it is assumed that at least the NAND array 10 and 8-input NAND gate 11 in the control system 10, the key matrix 6, and the Schmitt trigger inverter 7 have received the power sources and that an ON key can be detected by the key matrix 6.

In the power OFF mode in step S20, an electric power consumption is extremely small. The processing routine advances to step S20 by the control, which will be explained hereinlater. Before step S20, the CPU 1 allows the latch 22 to latch a predetermined value and sets the multiplexer 12 so as to output the input (signal line $L_9$) of the terminal $C_0$. However, the signal of the signal line $L_9$ is not output as it is but the inverted signal is output from the multiplexer 12. On the other hand, prior to step S20, the mask data of the latch 9 is preset so that at least the ON key input can be detected.

When the ON key is input, the key input signal is input to the terminal $C_0$ of the multiplexer 12 through the NAND array 10 and 8-input NAND gate 11 and this signal is output to the signal line $L_{10}$. The input of the ON key is shown as step S22 in FIG. 1B.

In step S22, the output of the signal line $L_{10}$ is output to the signal line $L_{11}$ through the multiplexer 13 and is latched by the flip-flop 14.

The flip-flop 14 sends an oscillation start signal to the flip-flop 3 via the signal line $L_{12}$ and also outputs a signal indicative of the presence of the key input to the CPU 1 as an interruption signal.

When the flip-flop 3 receives the oscillation start signal, the oscillator 2 executes a predetermined oscillation warming-up operation and, thereafter, supplies an operation clock to the CPU 1 through the signal line $L_1$.

On the other hand, the LCP driver 32 is also actuated through a system (not shown) and the supply of the clocks $\phi$ is started.

When the operation clock is supplied to the CPU 1, in steps S26 and S27, the CPU 1 scans the key matrix 6 one line by one and reads out data from the 3-state buffer 8 and discriminates which key has been depressed. Then, the CPU 1 executes a processing corresponding to the input key.

In step S26, the CPU 1 writes information of all logic "1" into the latch 4 via the signal line $L_2$. Then, the output of the latch 4 is transmitted by the signal line $L_3$ and is inverted via the open drain buffer 5 and is output as a key strobe signal to the key matrix 6 through the signal line $L_4$.

On the other hand, when the external clocks $\phi$ are operative, the CPU 1 sets through the latch 22 in a manner such that the input at the terminal $C_2$, namely, the output at the AND gate 19 is output from the multiplexer 12 through the signal line $L_{10}$.

After completion of the setting in step S26, a key input is executed in step S27. At this time, since all of the strobe signals of the key matrix 6 have been output, if either one of the keys of the key matrix 6 is depressed, the strobe signal is input to either one of the bits of the Schmitt trigger inverter 7 through the signal line $L_5$.

The Schmitt trigger inverter 7 inverts the strobe signal and outputs. At this time, all of the bits of the output of the latch 9 are set to logic "1" by the CPU 1 and are output from the signal line $L_7$.

When the key strobe signal is received from the signal line $L_6$, the NAND array 10 outputs the logic "0" to the 8-input NAND gate 11 through the signal line $L_8$. Therefore, the NAND gate 11 outputs the logic "1" to the signal line $L_9$.

The signal of the signal line $L_9$ is transformed into four signals via the inverter 21, shift registers each comprising the flip-flops 16 to 18, and AND gates 19 and 20. The four signals are input to the multiplexer 12. However, as mentioned above, the output at the terminal $C_2$ from the AND gate 19, that is, the signal from which the ON-chattering was eliminated by the delay of the flip-flops 16a to 18a passes through the multiplexer 12.

On the other hand, the CPU 1 scans the key matrix 6 one line by line and reads out the data from the 3-state buffer 8 and discriminates which key has been depressed. Then, the CPU 1 executes the processing corresponding to the depressed key in step S28.

After completion of the processing in step S28, step S30 follows and the CPU 1 outputs a strobe of the key which was read out and also masks the output of the latch 9 corresponding to the area other than the lines of the key which were read and stops the oscillation of the oscillator 2 through the flip-flop 3. However, prior to the above processing, the latch 22 is set in a manner such that the output (terminal $C_3$) of the AND gate 20 is used as a signal which is output from the multiplexer 12 in the case where the clock $\phi$ is operative and that the output (terminal $C_1$) of the inverter 21 is used as a signal which is output from the multiplexer 12 in the case where the clock $\phi$ is inoperative.

In step S32, if the read key has been released, the oscillator 2 starts the oscillation and an interruption is executed for the CPU 1. Therefore, after the elapse of the OFF-chattering time of the key, the CPU 1 confirms that the key is not depressed through the 3-state buffer 8. After that, the CPU 1 executes the OFF processing of a predetermined key in step S34.

The processing routine is returned to step S24 and a check is made to see if a key has been input or not. The above series of operations are repeated.

If the clock $\phi$ is inoperative, the CPU 1 eliminates the ON-chattering and OFF-chattering of the key in a manner of software. However, in the cases where the oscillation of the oscillator 2 operates and where it is stopped, the times to detect the chattering change by a time corresponding to only the warming-up of the oscillation.

On the other hand, if the warming-up time of the oscillation is used to eliminate the chattering, the operating efficiency rises. Therefore, in this case, the output of the OR gate 15 is used as an output of the multiplexer 13.

An oscillation control signal of the flip-flop 3 is input to one input terminal of the OR gate 15 through the signal line $L_{13}$. By outputting an output signal of the OR gate 15 to the signal line $L_{11}$, the interruption of the key is generated certainly after the oscillation was stopped.

According to the above embodiment, even if the operation clocks of the CPU were stopped, the presence of the key input and the release of the key are detected. The oscillation of the operation clocks of the CPU can be started and an interruption can be executed for the CPU. On the other hand, the chattering of the key can be eliminated separately from the operation clocks of the CPU. Thus, the current consumption in the key input waiting mode can be minimized. That is, the supply of the clocks to the CPU 1 can be stopped and the CPU 1 can be set into the stand-by mode for a period of time other than the period of time when a key input is performed and the CPU 1 executes the processing corresponding to the input key. Therefore, the electric power consumption in the key input waiting period of time can be certainly reduced irrespective of the memory chip which is used. In addition, since the chattering can be eliminated irrespective of the operating state of the CPU, no erroneous operation occurs.

Further, since the control system 100 in FIG. 1A-1 and 1A-2 uses the clocks of the display system, there is also an advantage such that the construction is simple.

Second embodiment

The above embodiment has been described with respect to an example in which the clock $\phi$ is obtained by frequency dividing the operation clock or the like of the common driver of the LCD and is used. However, as shown in FIG. 2, the invention can be also similarly embodied by separately providing an oscillator 41 of a frequency which is relatively lower than that of the operation clocks of the CPU and a flip-flop 42 to control the oscillation of the oscillator 41. The flip-flop 42 is controlled by the CPU 1.

Third embodiment

Figure 3:
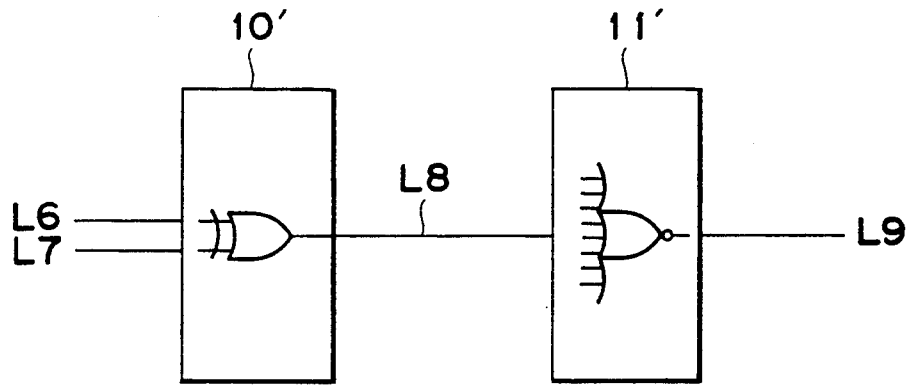

The above embodiment has been described with respect to an example in which the NAND array 10 and 8-input NAND gate 11 are used to check the state of a key. However, as shown in FIG. 3, the invention can be also similarly embodied by using an execlusive OR gate array 10' and a multi-input NOR gate 11'. Other various combinations such as an NOR array and a multi-input NAND and the like are considered.

Fourth embodiment

Figure 4:
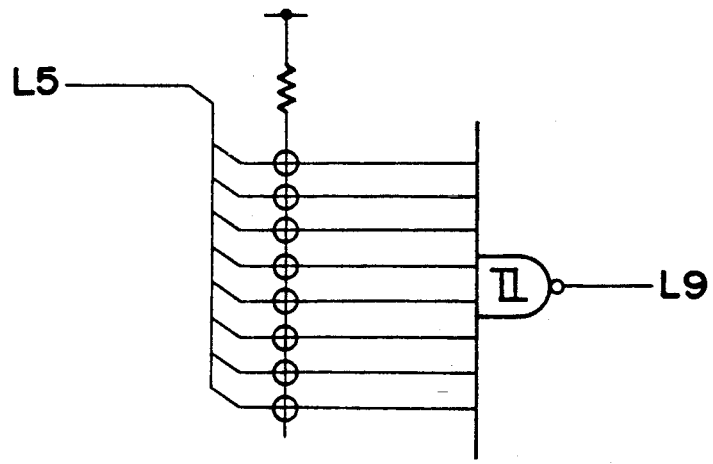

First, the invention can be also similarly embodied by further simplifying the first or third embodiment, namely, by using a multi-input Schmitt NAND in FIG. 4 in place of the latch 9, NAND array 10, and 8-input NAND gate 11 in FIGS. 1A-1 and 1A-2. In brief, it is sufficient to generate a clock control signal and an interruption signal when any one of the key is depressed or released. However, in this case, complicated processings such as key roll over and the like cannot be performed.

Fifth embodiment

In the first embodiment, the method whereby the key is read by using the Schmitt trigger inverter 7 and 3-state buffer 8 has been described. However, the key can be also read by the 3-state buffer 8 if a Schmitt input 3-state buffer is used.

Sixth embodiment

In the first embodiment, the method whereby the processings are executed by regarding that the ON-chattering time and the OFF-chattering time are the same time for convenience of explanation has been described. However, the ON-chattering time and the OFF-chattering time can be also individually set by changing the dividing numbers of the prescaler for the key-ON waiting period and the key-OFF waiting period or by setting the numbers of stages of the shift register for the ON-chattering and the OFF-chattering to different numbers.

As will be obviously understood from the above description, according to the invention, in an electronic apparatus which executes a predetermined information processing by CPU which can stop the oscillation of operation clocks and can shift to the stand-by mode, there are provided: a key inputting device; key-ON interruption signal generating means for generating an interruption signal when a key of the key inputting device is depressed; key-OFF interruption signal generating means for generating an interruption signal when a key of the key inputting device is released; interruption selecting means for selectively making either one of the above interruption signals from the two interruption signal generating means effective in accordance with a command of the CPU; and clock generating means for starting the oscillation of the operation clocks of the CPU by the interruption which was selected by the interruption selecting means. For the key input waiting period of time, the key-ON interruption signal is selected and the operation clocks of the CPU are stopped. When a key is depressed, the operation clocks are supplied to the CPU. After the elapse of the ON-chattering time of the key, the CPU reads the depressed key and executes a processing corresponding to the depressed key. After completion of the processing, the key-OFF interruption signal is selected and the operation clocks of the CPU are again stopped. When the key is released, the operation clocks are again supplied to the CPU. After the CPU confirmed that the key is not depressed after the elapse of an OFF-chattering time of the key, the CPU executes a predetermined key-OFF processing and the processing to wait for another key input is again repeated. Therefore, by providing means for detecting the ON/OFF of the key even during the stop of the operation clocks of the CPU and means for eliminating the ON-chattering and OFF-chattering of the key, only when the key is depressed and the CPU reads the depressed key and a processing corresponding to the depressed key must be executed, the operation clocks can be supplied to the CPU. There is an excellent effect such that an electric power consumption for a key input waiting period of time can be certainly fairly reduced irrespective of a construction of a memory chip or the like.

I claim:

1. An electronic apparatus having input means, comprising:
   key input means for executing a key input;
   key-ON interruption signal generating means for generating an interruption signal when a key of said key input means is depressed;
   key-OFF interruption signal generating means for generating an interruption signal when a key of said key input means is released;
   interruption signal selecting means for selectively making either one of the interruption signals from said two interruption signal generating means effective in accordance with a command of a central processing unit (CPU);
   clock generating means for starting oscillation of operation clocks to the CPU by the interruption signal selected by said interruption signal selecting means,
   wherein the CPU can stop the oscillation of the operation clocks which are generated from said clock generating means and can shift to a stand-by mode; and
   control means for executing a control for the CPU in a manner such that the key-ON interruption signal is selected for a key input waiting period of time and the operation clocks to the CPU are stopped, and when a key is depressed, the operation clocks are supplied to the CPU, the CPU reads the depressed key after the elapse of an ON chattering time of the key and executes a processing corresponding to the depressed key, and after completion of the processing, the key-OFF interruption signal is selected and the operation clocks to the CPU are again stopped, and when the key is released, the operation clocks are again supplied to the CPU, and the CPU confirms that the key is not depressed after the elapse of an OFF chattering time of the key and, thereafter, the CPU executes a predetermined key OFF processing, and the key input waiting processing is again repeated.

2. An electronic apparatus according to claim 1, further having synchronous interruption generating means which is constructed in a manner such that after the clock generating means stopped the oscillation of the operation clocks to the CPU, the interruption by the key of the key input means is made effective synchronously with the stop of the oscillation.

3. An electronic apparatus according to claim 2, wherein either one of the two interruption signal generating means generates the key interruption signal by a turn-on or a turn-off of a predetermined key which has previously been set by the CPU by masking an output of the key input means.

4. An electronic apparatus according to claim 1, wherein either one of the two interruption signal generating means generates the key interruption signal by a turn-on or a turn-off of a predetermined key which has previously been set by the CPU by masking an output of the key input means.

5. An electronic apparatus having input means, comprising:
   key input means for executing a key input;
   interruption signal generating means for generating a key-ON interruption signal when a key of the key input means is depressed and for generating a key-OFF interruption signal when the key is released;
   interruption signal selecting means for selectively making either one of the key-ON and key-OFF interruption signals generated from the interruption signal generating means effective;
   processing means for reading the depressed key after the elapse of an ON-chattering time by the key input means and executing a first processing corresponding to a turn-on of said key, and for confirming that the key is not depressed after the elapse of an OFF-chattering time by the key input means and, thereafter, executing a second processing corresponding to a turn-off off of the key; and
   clock generating means for oscillating operation clocks upon turn-on and turn-off operations of the key by the interruption signal selected by the interruption signal selecting means and supplying the operation clocks to the processing means, and for selecting the key-ON interruption signal for a key input waiting period of time and stopping the operation clocks to the processing means, and after completion of the processing by the processing means, for selecting the key-OFF interruption signal and stopping the operation clocks to the processing means.

6. An electronic apparatus according to claim 5, further having synchronous interruption generating means which is constructed in a manner such that after the clock generating means stopped the oscillation of the operation clocks to the processing means, the interruption by the key of the key input means is made effective synchronously with the stop of the oscillation.

7. An electronic apparatus according to claim 6, wherein the interruption signal generating means generates the key interruption signal by a turn-on or a turn-off of a predetermined key which has previously been set by the processing means by masking an output of the key input means.

8. An electronic apparatus according to claim 5, wherein the interruption signal generating means generates the key interruption signal by a turn-on or a turn-off of a predetermined key which has previously been set by the processing means by masking an output of the key input means.

* * * * *

UNITED STATES PATENT AND TRADEMARK OFFICE
CERTIFICATE OF CORRECTION

PATENT NO. : 5,140,539
DATED : August 18, 1992
INVENTOR(S) : ISAO OHDAIRA

It is certified that error appears in the above-identified patent and that said Letters Patent is hereby corrected as shown below:

COLUMN 8

Line 30, "stopped" should read --stops--.
Line 54, "and" should read --or--.

COLUMN 9

Line 14, "stopped" should read --stops--.

COLUMN 1

Line 35, "the" should be deleted.
Line 52, "rans" should read --runs--.

COLUMN 2

Line 68, "HAND" should read --NAND--. and
"AND" should read --NAND--.

COLUMN 4

Line 18, "system 10," should read --system 100,--.
Line 49, "LCP" should read --LCD--.

UNITED STATES PATENT AND TRADEMARK OFFICE
CERTIFICATE OF CORRECTION

PATENT NO. : 5,140,539

DATED : August 18, 1992

INVENTOR(S) : ISAO OHDAIRA

It is certified that error appears in the above-identified patent and that said Letters Patent is hereby corrected as shown below:

<u>COLUMN 6</u>

Line 20, "Fig." should read --Figs.--.
Line 28, "and is used" should be deleted.
Line 41, "execlusive" should read --exclusive--.

Signed and Sealed this

Twenty-sixth Day of October, 1993

Attest:

BRUCE LEHMAN

*Attesting Officer*  *Commissioner of Patents and Trademarks*